United States Patent
Aoyagi

[11] Patent Number: 5,912,785
[45] Date of Patent: Jun. 15, 1999

[54] MAGNETIC DISC STORAGE DEVICE

[75] Inventor: Masaaki Aoyagi, Ibaraki, Japan

[73] Assignee: NEC Corporation, Japan

[21] Appl. No.: 08/950,228

[22] Filed: Oct. 14, 1997

[30] Foreign Application Priority Data

Oct. 15, 1996 [JP] Japan ................................. 8-272017

[51] Int. Cl.$^6$ ................................................ G11B 17/02
[52] U.S. Cl. ................................................. 360/99.08
[58] Field of Search ......................... 360/98.07, 99.04, 360/99.08

[56] References Cited

U.S. PATENT DOCUMENTS 3,938,964  2/1976  Schmidt .................................. 29/191.4
3,945,555  3/1976  Schmidt .................................. 228/126

FOREIGN PATENT DOCUMENTS 59-21248   2/1984  Japan .
6-251577   9/1994  Japan .
8-203222   8/1996  Japan .

Primary Examiner—Robert S. Tupper
Attorney, Agent, or Firm—Hayes, Soloway, Hennessey, Grossman & Hage PC

[57] ABSTRACT

The present invention provides a spindle motor shaft mechanically supporting via at least a bearing a hub of a spindle motor provided in a magnetic disc storage device for allowing the spindle motor to rotate around the spindle motor shaft. The spindle motor shaft comprises an aluminum-beryllium alloy which has such a high vibration attenuation factor as to effectively attenuate a vibration caused at the bearing in rotation of the spindle motor around the spindle motor shaft. As a result, the aluminum-beryllium alloy spindle motor shaft prevents transmission of the vibration through the spindle motor shaft to a cover of a housing. The noise caused by vibration of the cover member of the housing can be reduced.

8 Claims, 2 Drawing Sheets

MAGNETIC DISC STORAGE DEVICE

BACKGROUND OF THE INVENTION

The present invention relates to a magnetic disc storage device, and more particularly to a magnetic disc storage device capable of reading and writing data to a magnetic disc which is on rotation.

The conventional magnetic disc storage device is disclosed in the Japanese laid-open patent publication No. 59-21248. The magnetic disc storage device has a spindle motor which rotates magnetic discs, and magnetic heads which are positioned adjacent to surfaces of the rotating magnetic discs for reading and writing data to the magnetic disc which is rotating. The spindle motor, the magnetic discs and the magnetic heads are accommodated in a housing. The housing comprises a base plate and a cover member. The spindle motor is provided with a motor main shaft which is fixed to the base plate and a hub which rotates around the motor main shaft. The magnetic discs are co-axially fixed to the hub. A head carriage is provided which is rotatable around a carriage main shaft so that the head carriage can move the magnetic head in generally radial direction of the magnetic disc. The top of the motor main shift is fixed via a screw to the cover member of the housing. The hub is rotatably attached via ball bearings to the motor main shaft.

The above magnetic disc storage device has a serious problem as follows. When the spindle motor rotates around the motor main shaft, a vibration appears on the ball bearings. This vibration is transmitted through the motor main shaft to the cover member of the housing. As a result, the cover member of the housing is vibrated to generate an undesirable noise.

In the above circumstances, it had been required to reduce the noise generated by vibration of the cover member of the housing, which has been transmitted through the motor main shaft from the ball bearings.

SUMMARY OF THE INVENTION

Accordingly, it is an object of the present invention to provide a novel magnetic disc storage device free from the above problem.

It is a further object of the present invention to provide a novel magnetic disc storage device which is capable of preventing a transmission of a vibration to a cover member, where the vibration has been generated at ball bearings provided between a hub of a spindle motor and a motor main shaft.

It is a further object of the present invention to provide a novel magnetic disc storage device which is capable of reducing a noise caused by vibration of a cover member of a housing.

The above and other objects, features and advantages of the present invention will be apparent from the following descriptions.

The present invention provides a spindle motor shaft mechanically supporting, via at least a bearing, a hub of a spindle motor provided in a magnetic disc storage device for allowing the spindle motor to rotate around the spindle motor shaft. The spindle motor shaft comprises an aluminum-beryllium alloy which has such a high vibration attenuation factor as to effectively attenuate a vibration caused at the bearing in rotation of the spindle motor around the spindle motor shaft. As a result, the aluminum-beryllium alloy spindle motor shaft prevents transmission of the vibration through the spindle motor shaft to a cover of a housing. The noise caused by vibration of the cover member of the housing can be reduced.

The aluminum-beryllium alloy is preferably a low concentration alloy which includes beryllium in the range of 30% to 60%. The aluminum-beryllium alloy is an age-hardening alloy. A top of the spindle motor shaft may preferably have a screw hole into which a screw is inserted to fix a cover member to the spindle motor shaft. Normally, the bearings may comprise ball bearings.

BRIEF DESCRIPTION OF THE DRAWINGS

Preferred embodiments according to the present invention will be described in detail with reference to the accompanying drawings.

PREFERRED EMBODIMENT

Figure 1:
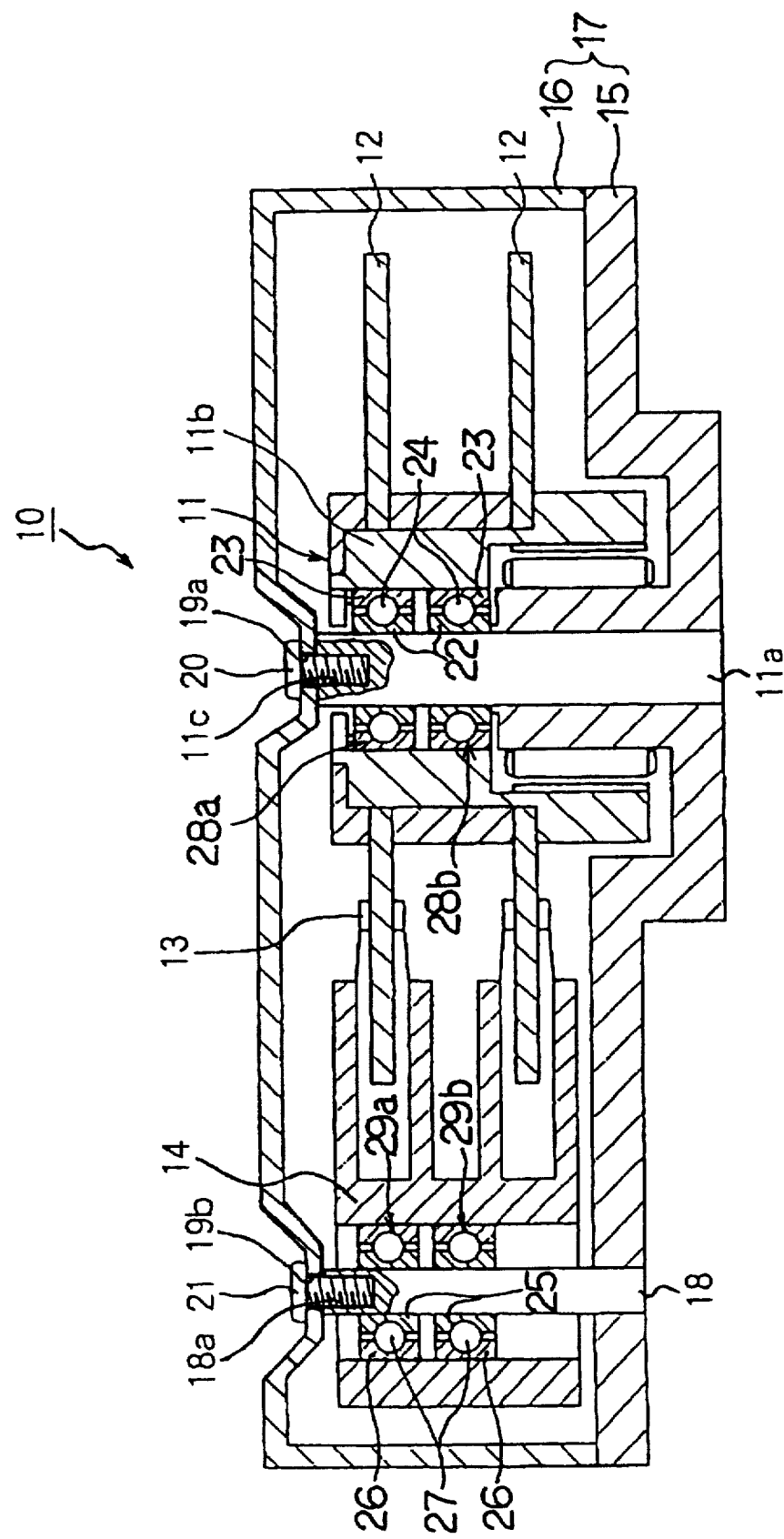
FIG. 1 is a cross sectional elevation view illustrative of a novel magnetic disc storage device in a preferred embodiment according to the present invention.
Figure 2:
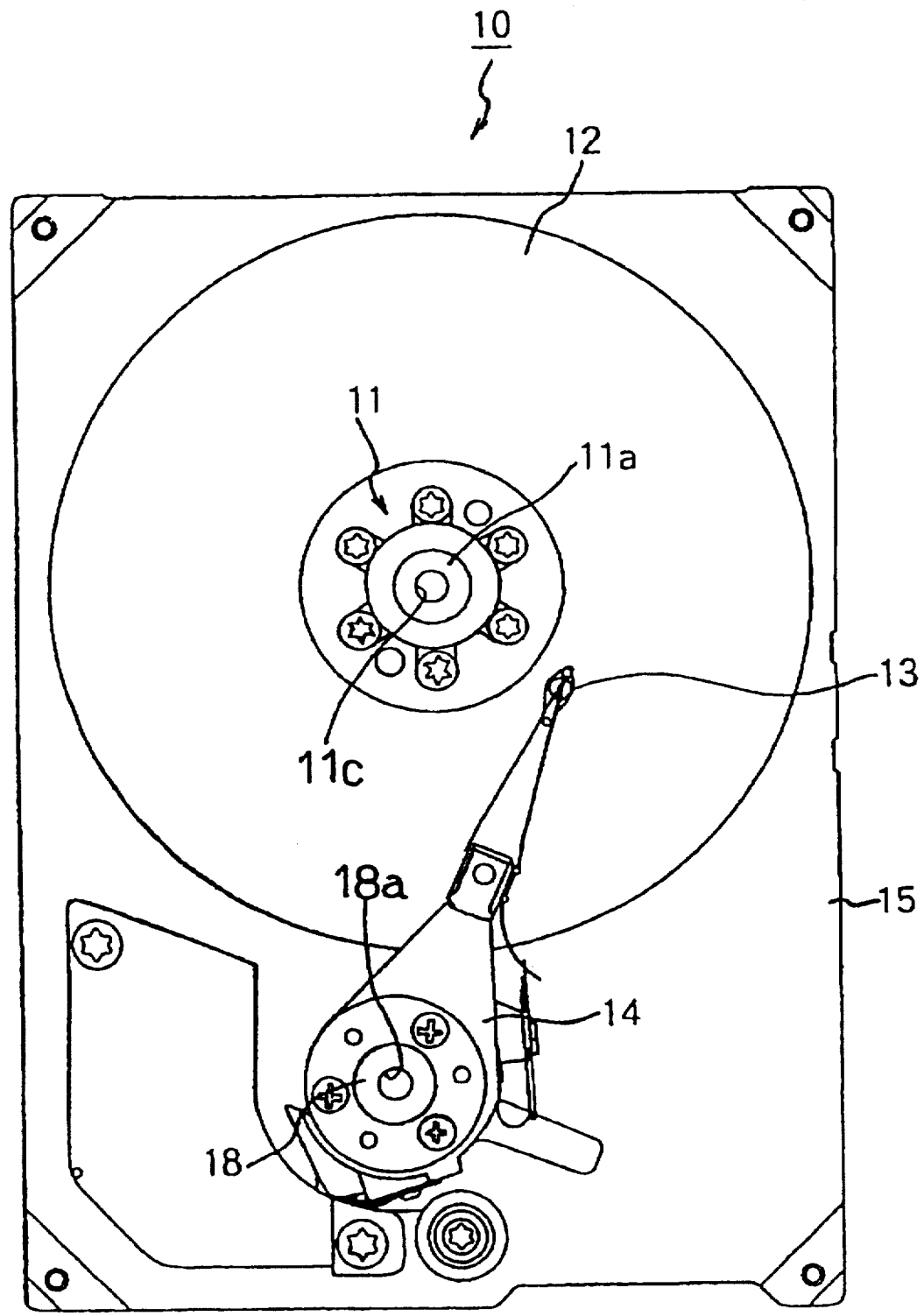
FIG. 2 is a plane view illustrative of an internal structure of a novel magnetic disc storage device wherein a housing cover is removed in a preferred embodiment according to the present invention.

A preferred embodiment according to the present invention will be described with reference to FIGS. 1 and 2. A magnetic disc storage device 10 has a housing 17 for accommodating a magnetic head disc assembly. This housing 17 comprises a base plate 15 and a cover member 16. The magnetic head disc assembly comprises a spindle motor 11, magnetic discs 12, magnetic heads 13 and a head carriage 14.

The spindle motor 11 is provided with a motor main shaft 11a fixed onto the base plate 15 and a hub 11b which is rotatable around the motor main shaft 11a. Upper and lower ball bearings 28a and 28b are provided between the motor main shaft 11a and the hub 11b. Each of the upper and lower ball bearings 28a and 28b comprises a pair of inner and outer rings 22 and 23 and balls 24 inserted between the inner and outer rings 22 and 23. An inner wall of the inner ring 22 is fixed onto an outer surface of the motor main shaft 11a. An outer wall of the outer ring 23 is fixed onto an inner wall of the hub 11b. Two of the magnetic disc 12 are co-axially fixed to an outer surface of the hub 11b so that the magnetic discs 12 rotate around the motor main shaft 11a together with the hub 11b.

A carriage main shaft 18 is provided which extends in parallel to the spindle motor main shaft 11a. However, the carriage main shaft 18 is eccentrically positioned from the spindle motor main shaft 11a. A head carriage 14 has an end which is provided with the magnetic head 13. The head carriage 14 is provided which is bi-directionally rotatable around the spindle motor main shaft 11a in a predetermined limited range, so as to move the magnetic heads 13 in generally radial direction of the magnetic disc 12, wherein the magnetic heads 13 remain positioned adjacent to but slightly distanced from surfaces of the magnetic discs 12 for enabling the magnetic heads 13 to read and write data to the magnetic discs 12. Two of upper and lower ball bearings 29a and 29b are provided between the carriage main shaft 18 and the head carriage 14. Each of the upper and lower ball bearings 29a and 29b comprises a pair of inner and outer rings 25 and 26 and balls 27 inserted between the inner and outer rings 25 and 26. An inner wall of the inner ring 25 is fixed onto an outer surface of the carriage main shaft 18. An outer wall of the outer ring 23 is fixed onto an inner wall of the head carriage 14.

The spindle motor main shaft 11a comprises an aluminum-beryllium alloy which has such a high vibration attenuation factor as to effectively attenuate a vibration caused at the bearing in rotation of the spindle motor around the spindle motor shaft. The aluminum-beryllium alloy is a low concentration alloy and includes beryllium in the range of 30% to 60%. The aluminum-beryllium alloy is an age-hardening alloy. As a result, the aluminum-beryllium alloy spindle motor main shaft 11a prevents transmission of the vibration through the spindle motor main shaft 11a to the cover of the housing. The noise caused by vibration of the cover member 16 of the housing 17 can be reduced. The carriage main shaft 18 comprises a stainless steel (SUS303). The carriage main shaft 18 extends in parallel to the spindle motor main shaft 11a. A screw hole 11c is formed at the top of the spindle motor main shaft 11a. A screw hole 18a is also formed at the top of the carriage main shaft 18. The cover member 16 has screw insertion holes 19a and 19b which are positioned in correspondence to the screw holes 11c and 18a respectively so that fixing screws 20 and 21 are screwed through the screw insertion holes 19a and 19b into the screw holes 11c and 18a so as to fix the cover member 16 to the spindle motor main shaft 11a and the carriage main shaft 18.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A spindle motor shaft mechanically supporting, via at least a bearing, a hub of a spindle motor provided in a magnetic disc storage device for allowing said spindle motor to rotate around said spindle motor shaft, wherein said spindle motor shaft comprises an aluminum-beryllium alloy.

2. The spindle motor shaft as claimed in claim 1, wherein said aluminum-beryllium alloy includes beryllium in the range of 30% to 60%.

3. The spindle motor shaft as claimed in claim 1, wherein a top of said spindle motor shaft has a screw hole into which a screw is inserted to fix a cover member to said spindle motor shaft.

4. The spindle motor shaft as claimed in claim 1, wherein said bearing is a ball bearing.

5. A magnetic disc storage device comprising:

a housing comprising a base plate and a cover member; and a magnetic head disc assembly accommodated in said housing, said magnetic head disc assembly further comprising:

a spindle motor with a hub which is rotatable around a spindle motor shaft;

at least a magnetic disc fixed to said hub so that said magnetic disc rotates together with said hub; and a head carriage provided with at least a magnetic head positioned adjacent to and slightly distanced from surface of said magnetic disc, said head carriage being bi-directionally rotatable around a carriage shaft to move said magnetic head in generally radial direction of said magnetic disc, wherein said spindle motor shaft comprises an aluminum-beryllium alloy.

6. The magnetic disc storage device as claimed in claim 5, wherein said aluminum-beryllium alloy includes beryllium in the range of 30% to 60%.

7. The magnetic disc storage device as claimed in claim 5, wherein a top of said spindle motor shaft has a screw hole into which a screw is inserted to fix a cover member to said spindle motor shaft.

8. The magnetic disc storage device as claimed in claim 5, wherein said bearing is a ball bearing.

\* \* \* \* \*